United States Patent [19]

Hulbert

[11] Patent Number: 5,713,074
[45] Date of Patent: Jan. 27, 1998

[54] MOBILE RADIO POWER CONTROL DEVICE USING THE COMPARISON OF RETRANSMITTED DATA

[75] Inventor: Anthony Peter Hulbert, Shirley, England

[73] Assignee: Roke Manor Research Limited, Hampshire, England

[21] Appl. No.: 514,006

[22] Filed: Aug. 11, 1995

[30] Foreign Application Priority Data

Aug. 11, 1994 [GB] United Kingdom ............... 9416202

[51] Int. Cl.$^6$ ...................................................... H04B 7/00
[52] U.S. Cl. ................................................ 455/69; 455/504
[58] Field of Search ........................... 455/126, 127, 455/68, 69, 13.4, 38.3, 52.1, 504; 375/297

[56] References Cited

U.S. PATENT DOCUMENTS

| | | | |
|---|---|---|---|
| 5,128,965 | 7/1992 | Henriksson | 455/69 |
| 5,457,808 | 10/1995 | Osawa | 458/69 |
| 5,533,095 | 7/1996 | Kikuchi | 379/57 |

FOREIGN PATENT DOCUMENTS

| | | |
|---|---|---|
| 0 115 139 A2 | 8/1984 | European Pat. Off. . |
| 0 538 870 A2 | 4/1993 | European Pat. Off. . |
| 2 268 365 A | 1/1994 | United Kingdom . |

*Primary Examiner*—Edward F. Urban
*Attorney, Agent, or Firm*—Hill, Steadman & Simpson

[57] ABSTRACT

A power controller apparatus for use in a mobile radio system wherein, when an error is detected in a transmitted signal, the transmit power is increased and when no error is detected, the transmit power is reduced by a smaller amount thus maintaining a constant bit error rate related to the ratio of the up and down step sizes. The power controller also contains a comparator for comparing the data which is transmitted with the data which has been transmitted to a station and retransmitted back.

4 Claims, 1 Drawing Sheet

MOBILE RADIO POWER CONTROL DEVICE USING THE COMPARISON OF RETRANSMITTED DATA

BACKGROUND OF THE INVENTION

The present invention generally relates to the field of telecommunications devices and, more particularly, the present invention relates to power control apparatus for use in mobile radio systems.

DESCRIPTION OF THE RELATED ART

Known apparatus for providing closed loop control of transmitted RF power, particularly in the context of CDMA Cellular Mobile Radio, include a means of measuring the received power, a means of comparing the measured power against a threshold, a means of generating a correction signal based on the above comparison, a means of communicating the correction signal from the receiver station to the transmitting station, and a means of controlling the transmission power at the transmitting station in accordance with the correction signal.

The principle is illustrated in FIG. 1. Here, the transmit power of the mobile station 2 is controlled by the base station 4. The mobile station 2 transmits at the current power level via a combiner/splitter and antenna 2a and has an oscillator 16 and a transmit amplifier 18. The signal is received at the base station 4 and the power is measured (the diode 6 represents a more complex power measurement operation). The power is then compared against a threshold by a comparator 8. When the power exceeds the threshold, a "down" signal is generated. When the power is less that the threshold, an "up" signal is generated. These signals are transmitted back to the mobile station via a modulator 10, through a combiner/splitter and antenna 4a over the other half of the duplex channel and received in the mobile station which demodulates the signal in the demodulator 12 and accumulates them (+1 for an "up" signal, −1 for a "down" signal), in the accumulator 14. The output of the accumulator 14 controls the amplifier 18, and hence the power directly, according to a logarithmic relationship.

A vital element in the above procedure is the measurement of received signal level. The control of power can only be as accurate as this measurement. This is not a problem for existing systems in which the power control update interval corresponds to several received bits of data and in which the required bit error rate is moderately low, and, therefore, the received signal-to-noise ration is moderately high. The ability to average the received power over several bits of signal gives a significant increase in signal to noise ratio, particularly if this can be done coherently or pseudo-coherently. However, consider the case where the bit rate is very low. In fact, consider the case where the transmitted bit rate is equal to the power control update rate and where the required error rate is moderately high. If a measurement of the received power is made in the receiving station, this can only be performed on the basis of a single bit. The signal-to-noise ratio is perhaps as low as 0 dB on that bit, so measurements will be heavily corrupted by noise.

This situation can arise, unlike that illustrated in FIG. 1, in the situation where rapid downlink power control is required so that the mobile must transmit power control signalling information to the base station. The transmission of this power control signalling information must, itself, be power controlled. For transmission of packet-type data, it may be a requirement to permit asymmetrical traffic flow so that, on occasions, data traffic will be flowing only on the downlink. In this case, the sole purpose of uplink transmissions is for power control of the downlink and these power control transmissions at the power control signalling rate must themselves be power controlled.

The particular difficulty of this situation is the fact that, when there is no uplink data traffic on a particular link, the interference generated by any control traffic flowing on that uplink should be minimized in order to maximize the total capacity available to other links which are active on their uplinks. If power control traffic is, in fact, the only control traffic on an uplink, then the transmission used to send it must be minimized, exploiting, as much as possible, the very low bit rate. This can only be achieved effectively by exerting fast power control over the power control information transmission.

An object of the present invention is to provide a power control apparatus for use in mobile radio systems wherein power control is exerted in a fast and efficient manner. Other objects and advantages of the present invention will become apparent from the following summary and detailed description of the presently preferred embodiments of the present invention.

SUMMARY OF THE INVENTION

The present invention provides a power controller apparatus for use in mobile radio systems that comprises a first station for transmitting data to and receiving data from a second station, a second station for receiving data from and transmitting data to said first station, said first station comprising a data source, a means for modulating the data source and a means for transmitting data derived from said data source, and a control means for controlling the power of the transmitting means depending on data which is transmitted from said first station to said second station, and then retransmitted back to said first station.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention generally relates to a power control apparatus for use in mobile radio systems. An embodiment of the present invention will now be described with reference to FIG. 2 which is a block diagram of the power control apparatus.

Figure 1:
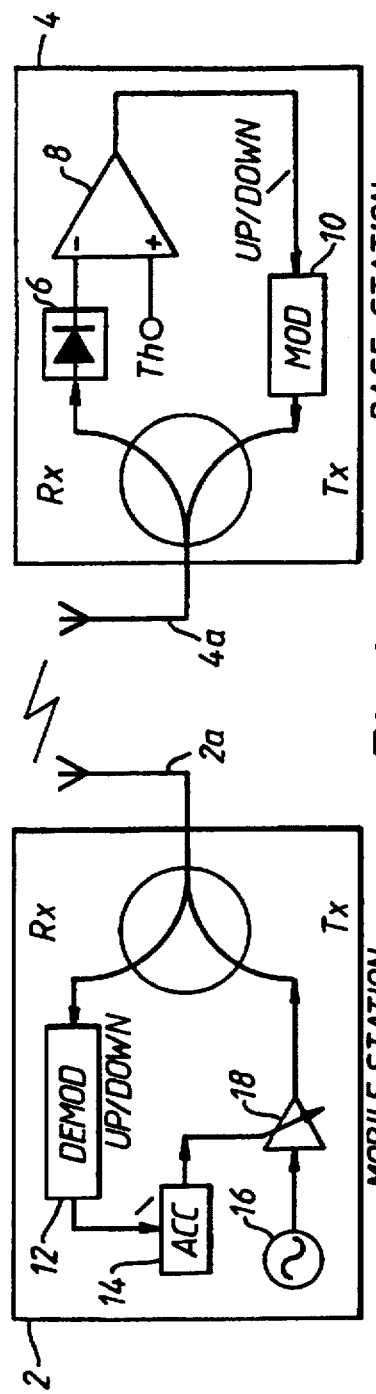
FIG. 1 illustrates a schematic block diagram of a conventional system.
Figure 2:
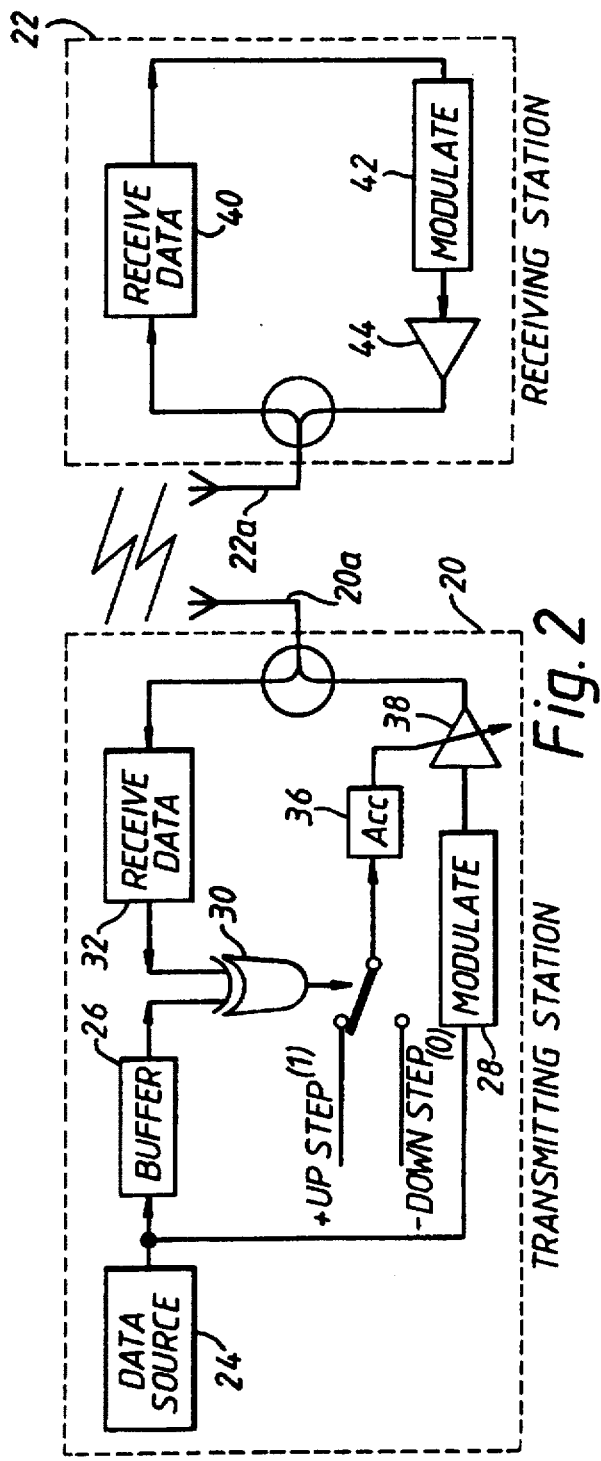
FIG. 2 illustrates a schematic block diagram of a preferred embodiment of the present invention.

Referring now to FIG. 2, there is shown a transmitting station 20 and a receiving station 22. The transmitting station includes a data source 24 connected to a buffer store 26 and to an input of a modulation circuit 28. The output of the buffer store 26 is connected to a first input of an exclusive OR gate 30, which, at a second input thereof, receives incoming data from the receiving station via the received data circuit 32. The output of the exclusive OR gate 30 controls a switch 34 which applies an up-step signal or a down-step signal to the input of an accumulator 36. An output from the accumulator 36 is connected to control a transmit amplifier 38.

The receiving station 22 includes a received data circuit 40 which is connected to an input of a modulation circuit 42, the output of which is connected to a transmit amplifier 44.

To avoid confusion in the following discussion, the station whose transmit power is being controlled by the invention described herein is referred to as the "transmitting station" (first station) while the station which is receiving the power controlled transmission and providing information relevant to the control of the transmitting station's power is referred to as the "receiving station" (second station). This terminology does not imply that the transmitting station cannot receive, nor does it imply that the receiving station cannot transmit.

Rather than measuring the power, the basic principle is to have the receiving station 22 simply demodulate the data and communicate this data back to the transmitting station 20, over the link operating in the other direction. It is assumed that the opposite direction link can be made more effectively, i.e., with lower errors, than the power controlled direction.

In the transmitting station 20, the bit which was transmitted is compared against the bit reflected back from the receiving station in order to identify those bits which were received in error at the receiving station. Whenever an error is detected, the transmitted power is increased by an amount U dB. Whenever an error is not detected, the transmitted power is decreased by an amount D dB.

In the steady state, the medium term average transmitted power is constant. Consider an interval of time consisting of N signalling bits. Suppose the bit error rate was B. Then, the average number of up-steps over internal N is N·B and the total power rise associated with the errors was U·N·B. This must have been cancelled by an equal power reduction. The power reduction is also given by $$N \cdot D (1-B)$$

because N(1−B) is the average number of steps in which there were no errors. Thus:

$$N \cdot D (1-B) = U \cdot N \cdot B.$$

Solving for B, we find that $$\frac{U}{U+D}$$

Thus, we can control the bit error rate directly simply by setting the ratio of U to D.

The optimum step size, U, is a function of the fading rate of the path. For slowly fading paths, U—and therefore D—should be made quite small. For rapidly fading paths, U should be made larger. The step size could be adapted according to measurements of the statistics of bit errors in the transmitting station.

For some systems, this "reflecting back" of data also permits a further advantage. For a low bit rate link, it is usually not possible to achieve coherent demodulation because of the phase ambiguity which can arise in any decision direction derivation of a carrier reference. However, if the data is reflected back. Then the transmitting end can detect a burst of errors (as that the carrier references has become inverted. In this case, the transmitting end simply inverts its transmission in order to compensate for the receiver inversion of data "at source."

The apparatus shown in FIG. 2 operates as follows. The transmitting station 2a modulates the data from the data source 24 via the modulation circuit 28 onto the transmitter at the current power level via a combiner/splitter and antenna 20a. This is received at the receiving station, modulated back onto its transmitter and sent back to the receiver in the transmitting station 22 by way of the transmitter amplifier 44 and combiner/splitter and antenna 22a. The two directions of communications would generally be differentiated by frequency; however, because of the delay around the modulation, propagation and demodulation paths in both directions, the data source is buffered by buffer store 26 before comparison against the reflected data. The exclusive OR gate 30 performs the comparison. If the bits are equal, its output will be low (o), and the accumulator 36 input will be fed with "-Down Step." If the bits are different, indicating an error, then the output will be high (1), and the accumulator input will be fed with "+Up Step." The output of the accumulator controls the power of the transmitter 38 in a logarithmic fashion.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A power controller apparatus for use in a mobile radio system comprising:

first and second stations, said first station transmitting data to and receiving data from said second station and said second station receiving data from and transmitting data to said first station;

said first station comprising:

a data source;

a means connected to said data source for modulating data to be emitted by said data source;

a means for transmitting data emitted by said data source, having a transmitting power; and a control means for controlling said transmitting power of the transmitting means dependent on data which is transmitted from said first station to said second station, and retransmitted back to said first station, said control means comprising a comparison means having a first input which receives the data from said data source and a second input connected to the data retransmitted from said second station, and wherein said comparison means generates an output signal for controlling a switching means which is arranged to provide an input signal to an accumulator, the accumulator having an output which is connected to a means for adjusting the transmission power of the first station.

2. The apparatus of claim 1 wherein the comparison means is an exclusive OR gate performing a comparison of the first and second inputs, and if the input bits at the first and second inputs are equal, then the output will be low and the accumulator will be fed with a down-step signal, and if the input bits are different, the output of the OR gate will be high and the accumulator input will be fed with an up-step signal.

3. The apparatus of claim 1 wherein the second station further comprises a means for receiving data, means for modulating the received data, and means for transmitting the modulated data back to the first station.

4. The apparatus of claim 1 wherein the first station is arranged to detect a burst of errors in data reflected back from said second station, and wherein detection of the burst of errors indicates that a carrier reference has become inverted and said first station further comprises a means inverting the data if it is transmitting to compensate for the burst of errors.

* * * * *